(12) United States Patent
Taoki

(10) Patent No.: US 10,567,639 B2
(45) Date of Patent: Feb. 18, 2020

(54) CONTROL APPARATUS, CONTROL METHOD, AND STORAGE MEDIUM

(71) Applicant: CANON KABUSHIKI KAISHA, Tokyo (JP)

(72) Inventor: Shinya Taoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/053,687

(22) Filed: Aug. 2, 2018

(65) Prior Publication Data

US 2019/0052797 A1 Feb. 14, 2019

(30) Foreign Application Priority Data

Aug. 9, 2017 (JP) ................................ 2017-153814

(51) Int. Cl.
*H04N 5/232* (2006.01)
*H04N 7/18* (2006.01)
*H04N 5/357* (2011.01)

(52) U.S. Cl.
CPC ..... *H04N 5/23216* (2013.01); *H04N 5/23206* (2013.01); *H04N 5/23238* (2013.01); *H04N 5/3572* (2013.01); *H04N 7/183* (2013.01)

(58) Field of Classification Search
None
See application file for complete search history.

(56) References Cited

U.S. PATENT DOCUMENTS

| | | |
|---|---|---|
| 2004/0155974 A1 | 8/2004 | Hong |
| 2006/0078329 A1 | 4/2006 | Ohnishi |
| 2007/0113255 A1 | 5/2007 | Kurosawa |
| 2011/0273570 A1 | 11/2011 | Sakaki |
| 2012/0124501 A1 | 5/2012 | Hunter |
| 2016/0239163 A1 | 8/2016 | Singal et al. |
| 2017/0177926 A1* | 6/2017 | Takayama .......... G06K 9/00255 |
| 2018/0025233 A1* | 1/2018 | Iwai ...................... H04N 5/225 348/143 |

FOREIGN PATENT DOCUMENTS

JP 2016058984 A 4/2016

* cited by examiner

*Primary Examiner* — James M Hannett
(74) *Attorney, Agent, or Firm* — Canon U.S.A., Inc. IP Division

(57) ABSTRACT

An acquisition unit acquires at least one of a first image captured by an image capturing unit and a partial image corresponding to a partial area of the first image. A setting unit sets at least one of a plurality of preset parameter sets in an image capturing apparatus including the image capturing unit wherein the plurality of preset parameter sets include at least one of a position setting parameter specifying a position of a partial image in the first image and an image quality setting parameter specifying image quality of the first image. A display control unit controls displaying such that a selection screen for setting at least one of the plurality of parameters in the image capturing apparatus is displayed on a display unit, and such that the selection screen displayed on the display unit is different depending on the image being acquired by the acquisition unit.

9 Claims, 16 Drawing Sheets

FIG. 4

```
START
  ↓
DETERMINE POSITION OF IMAGE          S500
TO BE CUT OUT FROM FISH-EYE IMAGE
  ↓
CUT OUT PORTION AT SPECIFIED POSITION   S501
FROM FISH-EYE IMAGE
  ↓
CORRECT EXTRACTED IMAGE INTO RECTANGULAR   S502
IMAGE BY PERFORMING GEOMETRIC TRANSFORM
  ↓
END
```

FIG. 5

| PRESET PARAMETERS | INFLUENCE ON OTHER STREAM IMAGE |
|---|---|
| IMAGE CUTOUT PARAMETERS (SPECIFYING CUTOUT POSITION) | — |
| X-COORDINATE OF CUTOUT PORTION | NO |
| Y-COORDINATE OF CUTOUT PORTION | NO |
| SIZE OF CUTOUT PORTION | NO |
| IMAGE QUALITY SETTING PARAMETERS | — |
| FOCUS VALUE | YES |
| EXPOSURE CORRECTION | YES |
| APERTURE | YES |
| IR CUT FILTER SWITCH | YES |
| INFRARED LIGHT ILLUMINATION | YES |
| SHUTTER SPEED | YES |

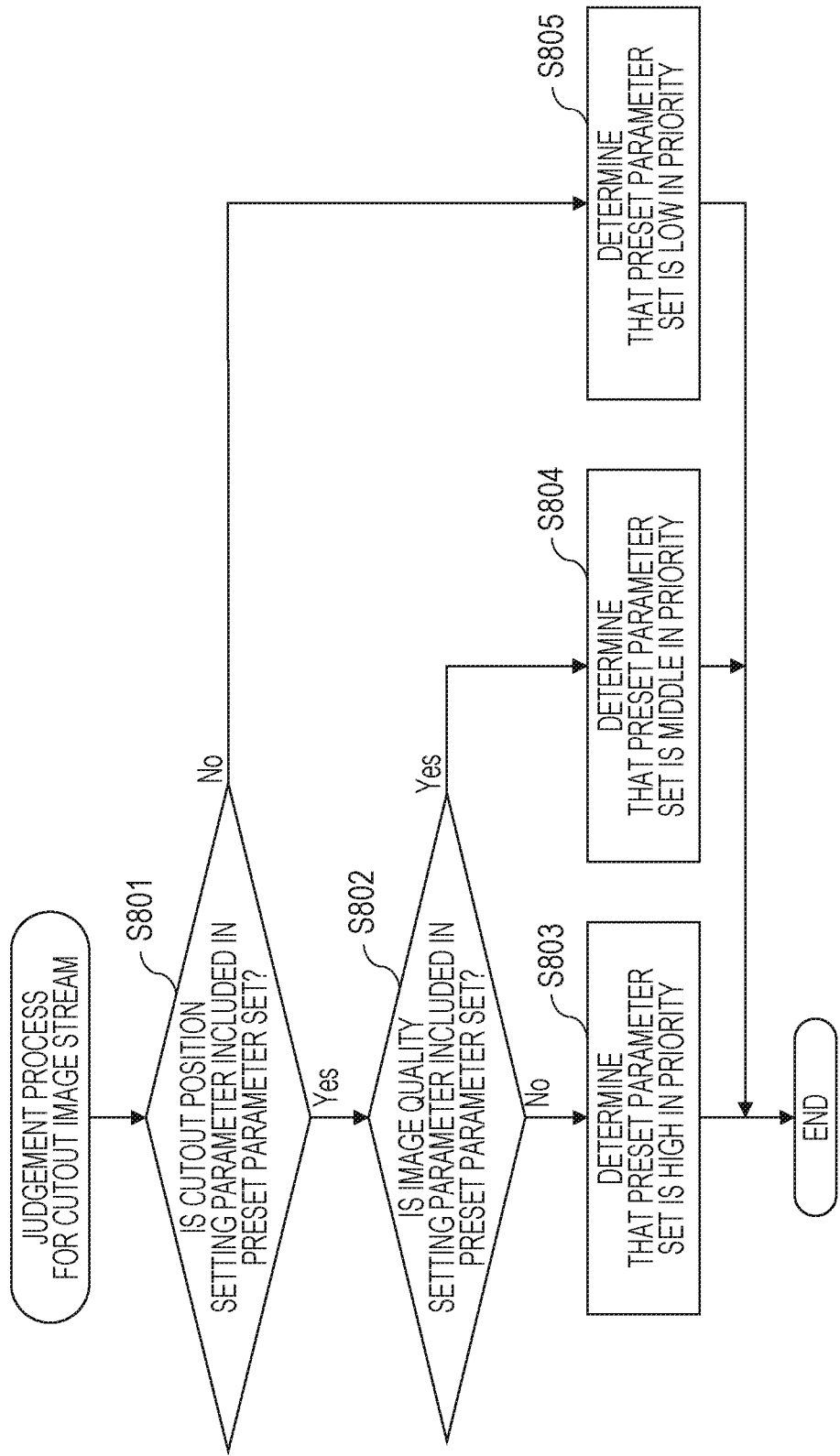

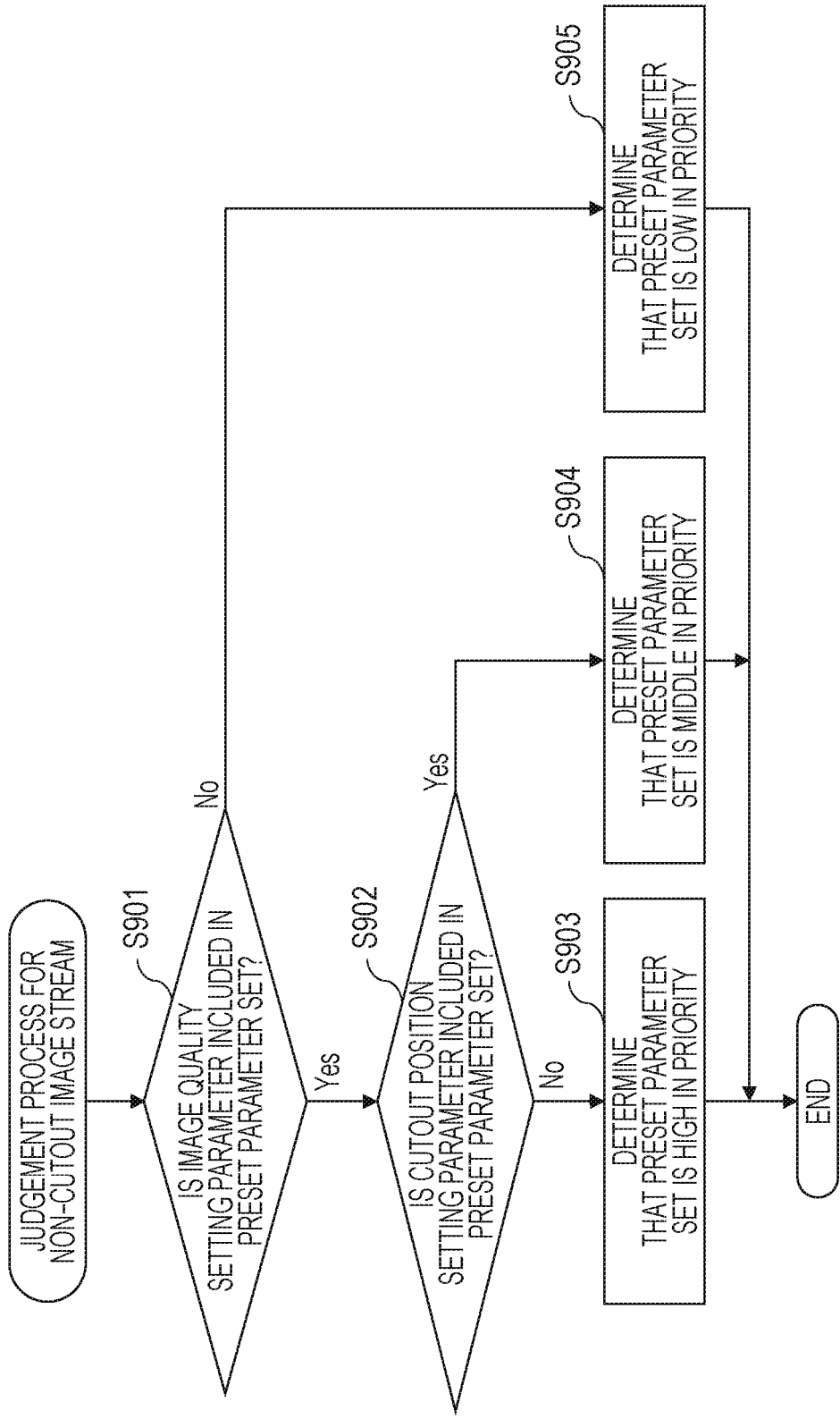

FIG. 9A

| | POSITION SETTING PARAMETERS | IMAGE QUALITY PARAMETERS |
|---|---|---|
| PRESET #1 | — | ○ |
| PRESET #2 | ○ | — |
| PRESET #3 | ○ | — |
| PRESET #4 | ○ | ○ |
| PRESET #5 | ○ | ○ |
| PRESET #6 | — | ○ |
| PRESET #7 | ○ | — |
| PRESET #8 | — | ○ |
| PRESET #9 | ○ | — |
| PRESET #10 | ○ | — |
| PRESET #11 | ○ | ○ |

FIG. 9B

| | PRIORITY (HIGH/MIDDLE/LOW) |
|---|---|
| PRESET #1 | LOW |
| PRESET #2 | HIGH |
| PRESET #3 | HIGH |
| PRESET #4 | MIDDLE |
| PRESET #5 | MIDDLE |
| PRESET #6 | LOW |
| PRESET #7 | HIGH |
| PRESET #8 | LOW |
| PRESET #9 | HIGH |
| PRESET #10 | HIGH |
| PRESET #11 | MIDDLE |

FIG. 9C

| | PRIORITY (HIGH/MIDDLE/LOW) |
|---|---|
| PRESET #1 | HIGH |
| PRESET #2 | LOW |
| PRESET #3 | LOW |
| PRESET #4 | MIDDLE |
| PRESET #5 | MIDDLE |
| PRESET #6 | HIGH |
| PRESET #7 | LOW |
| PRESET #8 | HIGH |
| PRESET #9 | LOW |
| PRESET #10 | LOW |
| PRESET #11 | MIDDLE |

FIG. 14A

| | POSITION SETTING PARAMETERS | IMAGE QUALITY PARAMETERS |
|---|---|---|
| PRESET #1 | — | ○ |
| PRESET #2 | ○ | — |
| PRESET #3 | ○ | — |
| PRESET #4 | ○ | — |
| PRESET #5 | ○ | — |
| PRESET #6 | — | ○ |
| PRESET #7 | ○ | — |
| PRESET #8 | — | ○ |
| PRESET #9 | ○ | — |
| PRESET #10 | ○ | — |
| PRESET #11 | ○ | — |

FIG. 14B

| | PRIORITY (HIGH/LOW) |
|---|---|
| PRESET #1 | LOW |
| PRESET #2 | HIGH |
| PRESET #3 | HIGH |
| PRESET #4 | HIGH |
| PRESET #5 | HIGH |
| PRESET #6 | LOW |
| PRESET #7 | HIGH |
| PRESET #8 | LOW |
| PRESET #9 | HIGH |
| PRESET #10 | HIGH |
| PRESET #11 | HIGH |

FIG. 14C

| | PRIORITY (HIGH/LOW) |
|---|---|
| PRESET #1 | HIGH |
| PRESET #2 | LOW |
| PRESET #3 | LOW |
| PRESET #4 | LOW |
| PRESET #5 | LOW |
| PRESET #6 | HIGH |
| PRESET #7 | LOW |
| PRESET #8 | HIGH |
| PRESET #9 | LOW |
| PRESET #10 | LOW |
| PRESET #11 | LOW |

CONTROL APPARATUS, CONTROL METHOD, AND STORAGE MEDIUM

BACKGROUND OF THE INVENTION

Field of the Invention

The present disclosure relates to a technique of controlling an image capturing apparatus.

Description of the Related Art

It is known to remotely control an image capturing apparatus by transmitting a command via a network or operating the image capturing apparatus via a remote control. It is also known to apply such a remote control technique to a surveillance camera system. By using the remote control technique, it is possible to change parameters relating to image quality such as an exposure, a while balance, or the like of an image captured by an image capturing apparatus.

It is also known to provide a function of cutting out a part of an image captured by an image capturing apparatus and transmitting (delivering) the resultant cutout partial image. In an image capturing apparatus having such a capability, it is possible to transmit a partial image as a video stream or store the partial image in a storage.

A parameter for setting (changing) image quality, a parameter for specifying a position of a partial image to be cut out from a captured image, and/or the like may be defined in a preset parameter set and stored in advance. The preset parameter set is actually applied to the image capturing apparatus in response to a command operation performed by a user or when a particular time comes. If a command to apply a preset parameter set is issued, the image capturing apparatus captures an image with picture quality specified by the preset parameter set, and cuts out a partial image at a position specified by the preset parameter set and transmits the resultant partial image.

Japanese Patent Laid-Open No. 2016-58984 discloses a presetting function technique that allows it to specify simultaneously both image quality and a capturing position of an image captured by an image capturing apparatus.

However, in the technique disclosed in Japanese Patent Laid-Open No. 2016-58984, a user is supposed to select a desired preset parameter set from a plurality of preset parameter sets registered in advance. Thus, in this technique, it is possible to select any preset parameter set regardless of types of parameters defined in the preset parameter set.

For example, when a user is receiving only a whole image, there may occur a possibility that the user is allowed to select even a preset parameter set including a parameter specifying a cutout position. However, the probability is rather low that this user selects a preset parameter set including a parameter specifying a cutout position. On the other hand, when a user is receiving only a video stream of a partial image, the probability is rather low that this user selects a preset parameter set to change image quality of a whole image.

It is possible to transmit a video stream to a plurality of users. In this situation, there is a possibility that when a user specifies a certain preset parameter set, this may cause an influence on streaming to another user. However, in the known technique, the same user interface for selecting a preset parameter set is displayed regardless of the type of an image being received by a user.

SUMMARY OF THE INVENTION

To provide a control technique capable of displaying a proper setting screen for selecting a preset parameter set, a control apparatus according to an aspect of the present disclosure include an acquisition unit configured to acquire at least one of a first image captured by an image capturing unit and a partial image corresponding to a partial area of the first image, a setting unit configured to set, in an image capturing apparatus including the image capturing unit, at least one of preset parameter sets including at least a position setting parameter specifying a position of the partial image in the first image and an image quality setting parameter specifying image quality of the first image, and a display control unit configured to control displaying so as to display, on a display unit, a selection screen for setting at least one of the plurality of preset parameter sets in the image capturing apparatus, wherein the display control unit controls displaying such that the selection screen displayed on the display unit is different depending on the image being acquired by the acquisition unit.

Further features of the present invention will become apparent from the following description of embodiments with reference to the attached drawings.

BRIEF DESCRIPTION OF THE DRAWINGS

FIG. 4 is a flow chart illustrating a cutout process and a distortion correction process according to an embodiment.

FIG. 5 is a diagram illustrating preset parameter sets according to an embodiment, and an influence of the preset parameter sets on other video streams.

FIG. 7 is a flow chart illustrating a cutout image priority determination process according to the first embodiment.

FIG. 8 is a flow chart illustrating a non-cutout image priority determination process according to the first embodiment.

FIGS. 9A to 9C are diagrams illustrating an example of a result of determination of priorities of preset parameter sets depending on video streams according to the first embodiment.

FIGS. 14A to 14C are diagrams illustrating an example of a result of determination of priorities of preset parameter sets depending on video streams according to the second embodiment.

DESCRIPTION OF THE EMBODIMENTS

Embodiments of the present disclosure are described in detail below with reference to accompanying drawings. Note that configurations disclosed in the respective embodiments described below are merely examples, and the present disclosure is not limited to those configurations. Each embodiment disclosed below is also applicable to an image capturing apparatus for a purpose other than surveillance and an apparatus for controlling such an image capturing apparatus. For example, each embodiment disclosed below is also applicable to an image capturing apparatus for capturing an image or a movie to be broadcast or an image capturing apparatus for capturing an image for private use.

In the embodiments described below, an explanation is given for, as an example, an image capturing apparatus configured to be capable of capturing an image over all directions, that is, an omni directional image, using an omnidirectional mirror or a fish-eye lens. This type of image capturing apparatus is capable of capturing an image of a wide area surrounding the image capturing apparatus. It is possible to obtain a torus-shape or circular-shape image (also called a fish-eye image) with an almost 180-degree field of view by using a single image capturing unit. More specifically, for example, in a case where the image capturing unit is installed on a wall, the 180-degree field of view covers a range from an upward vertical direction in which a ceiling is seen from the image capturing unit to a downward vertical direction in which to a floor is seen from the image capturing unit. That is, a space in front of the wall on which the image capturing unit is installed is captured as an image in the 180-degree field of view. On the other hand, in a case where the image capturing unit is installed on a ceiling, a space below the ceiling is captured as an image in the 180-degree field of view. However, the image used is not limited to the omnidirectional image, but the technique may be applied to any kind of image as long as a partial image can be cut out from the image. In the embodiments described below, the non-cutout image does not necessary need to an image which is currently being subjected to a cutout process, but the non-cutout image may be an image from which a partial image can be cut out in response to an operation by a user.

First Embodiment

Figure 1:
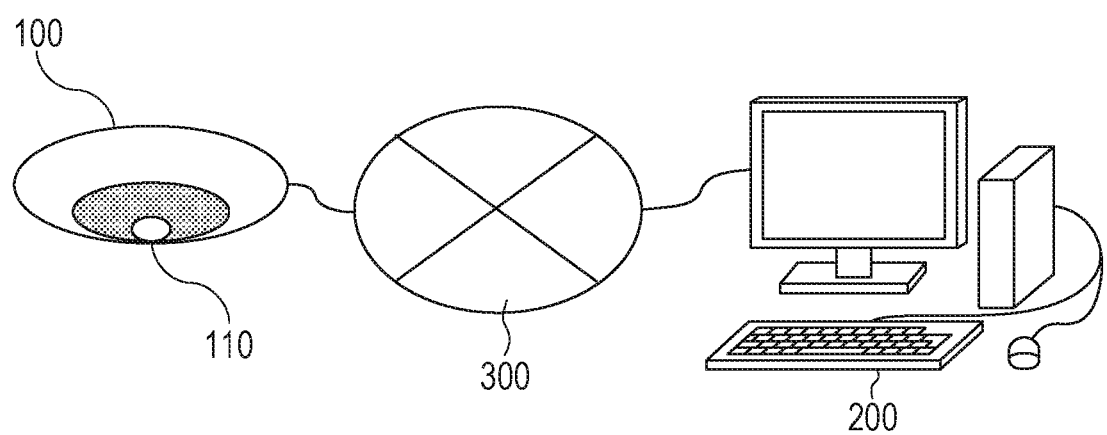
FIG. 1 is a diagram illustrating a network configuration including an image capturing apparatus and a client apparatus according to an embodiment.

First, referring to FIG. 1, a network configuration according to an embodiment described below.

An image capturing apparatus 100 captures an image using a fish-eye lens 110. The image capturing apparatus 100 is capable of capturing a fish-eye image of an almost circular shape with a 180-degree field of view.

The image capturing apparatus 100 is connected to a client apparatus (a control apparatus) 200 via a network 300 such that a communication between them is allowed.

The client apparatus 200 transmits, to the image capturing apparatus 100, a command to specify image quality of an image to be captured by the image capturing apparatus 100, a position of an area of an image from which a partial image is cut out, or the like. The image capturing apparatus 100 executes an operation according to the command, or returns a response to the command to the client apparatus 200. Transmission of these commands may be performed, for example, via communication according to the ONVIF (Open Network Video Interface Forum) standard. Note that the communication method is not limited to this example, but various communication methods may be used. Either a wired communication technique or a wireless communication technique may be used.

In the following description, by way of example, the client apparatus 200 operates as a control apparatus. Instead, the image capturing apparatus 100 may function as the control apparatus.

Figure 2:
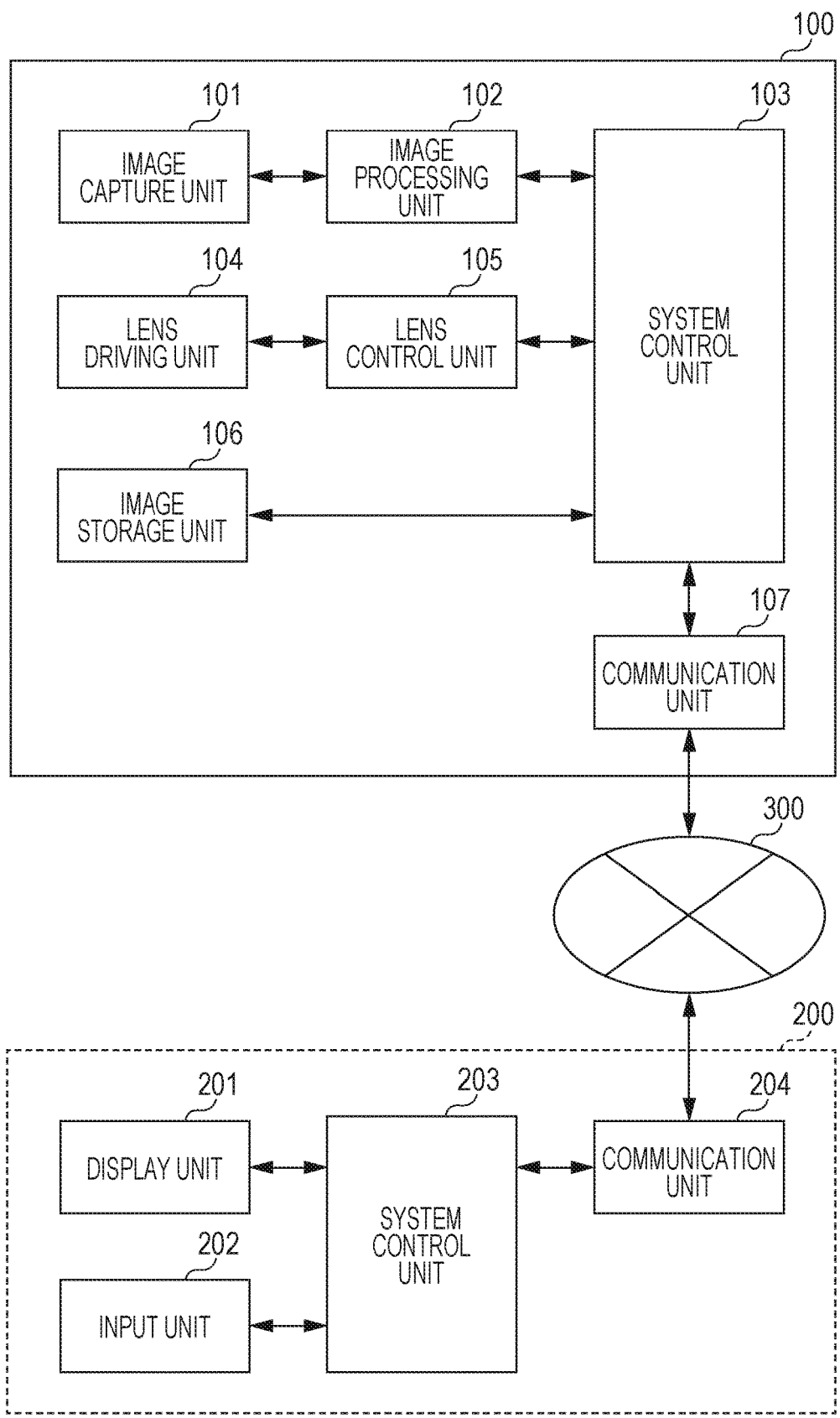
FIG. 2 is a functional block diagram illustrating an image capturing apparatus and a client apparatus according to an embodiment.

FIG. 2 is a functional block diagram illustrating the image capturing apparatus 100 and the client apparatus 200 according to the present embodiment.

First, the image capturing apparatus 100 is described below for each block. The image capturing apparatus 100 includes an image capture unit 101, an image processing unit 102, a system control unit 103, a lens driving unit 104, a lens control unit 105, an image storage unit 106, and a communication unit 107.

The image capture unit 101 receives, at an image sensing device, an image focused via a lens and converts the received light into electric charges thereby generating a captured-image signal. As for the image sensing device, for example, a CMOS image sensor (Complementary Metal Oxide Semiconductor Image Sensor) may be used. Alternatively, a CCD image sensor (Charge Coupled Device Image Sensor) may be used as the image sensing device.

The image processing unit 102 generates image data by converting the captured-image signal generated by the image capture unit 101 into a digital image signal. When the image data is generated, the image processing unit 102 performs various image processing to correct the image quality. The image processing is performed according to image quality setting parameters described below. The image processing unit 102 also performs a process to extract a partial image from the image obtained as a result of the image processing. The image processing unit 102 may further perform compression-coding on the image data thereby generating compression-coded image data.

The communication unit 107 transmits a video stream based on the image data generated by the image processing unit 102 to the client apparatus 200. The image data is, for example, moving image data. When the communication unit 107 receives a command transmitted from the client apparatus 200, the communication unit 107 transfers the received command to the system control unit 103. The communication unit 107 also transmits a response to the command to the client apparatus 200 under the control of the system control unit 103, As described above, the system control unit 103 also functions as a communication control unit.

The system control unit 103 of the image capturing apparatus 100 analyzes the command received via the communication unit 107 and performs a process according to the command.

For example, according to the command, the system control unit 103 controls the image processing unit 102 to execute an image quality adjustment process according to image quality setting parameters.

The lens control unit 105 controls the lens driving unit 104.

The lens driving unit 104 includes a driving system for driving a focus lens and a zoom lens, and a motor functioning as a driving source whereby the lens driving unit 104 changes a focus state or a zoom state.

The image storage unit 106 stores image data in an internal storage or an external storage. The internal storage or the external storage may be an HDD (Hard Disk Drive), a flash memory, or the like.

Next, referring to FIG. 2, the client apparatus 200 is described below for each block thereof. Note that the client apparatus 200 may also be realized by installing a program in a computer such as a personal computer, a tablet terminal, a smartphone, or the like.

The display unit 201 displays an image according to the image data received from the image capturing apparatus 100, and a graphical user interface (hereinafter referred to as a GUI) for controlling the image capturing apparatus. The GUI includes a selection screen for selecting a preset parameter set described below.

The display unit 201 may be realized by a display device using a liquid crystal panel, an organic EL panel, or the like. The display unit 201 performs a displaying operation under the control of the system control unit 203. Note that the display unit 201 may be disposed separately from the client apparatus 200.

The input unit 202 may be realized by a device such as a keyboard, a mouse, or the like. A user of the client apparatus 200 operates the GUI via the input unit 202. The input unit 202 may be realized using a touch panel.

The system control unit 203 of the client apparatus 200 generates a command in accordance with an input operation performed by the user, and transmits the generated command to the image capturing apparatus 100 via the communication unit 204. By transmitting the command in this manner, the client apparatus 200 is capable of controlling the image capturing apparatus 100 or setting the preset parameter set described below in the image capturing apparatus 100.

The system control unit 203 also controls displaying such that an image is displayed on the display unit 201 according to image data received from the image capturing apparatus 100 via the communication unit 204.

As described above, the system control unit 203 also functions as a communication control unit or a display control unit.

Figure 3A:
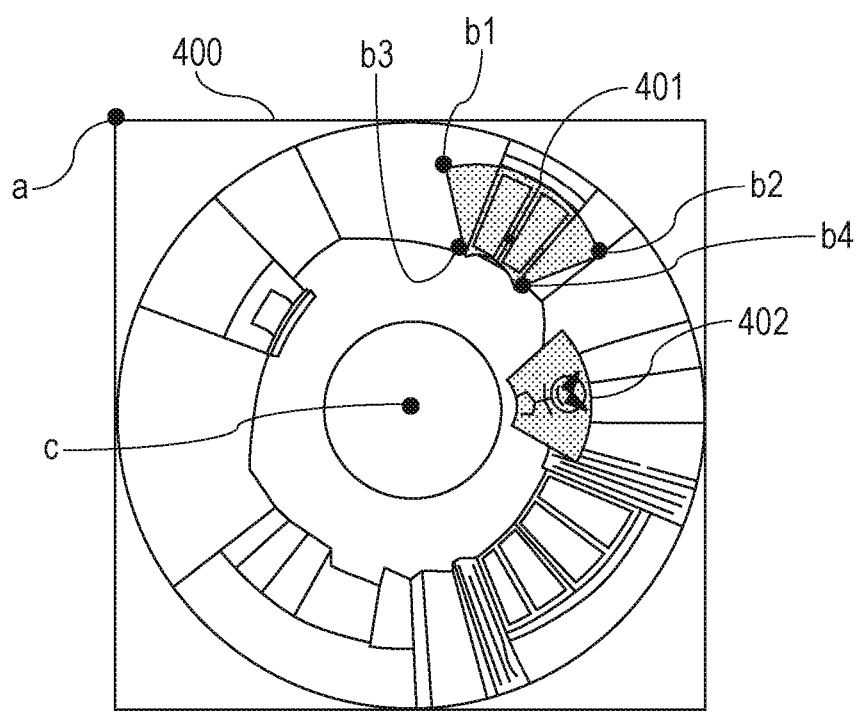
FIGS. 3A to 3C are diagrams for illustrating a process of cutting out a partial image from a captured image according to an embodiment.
Figure 3B:
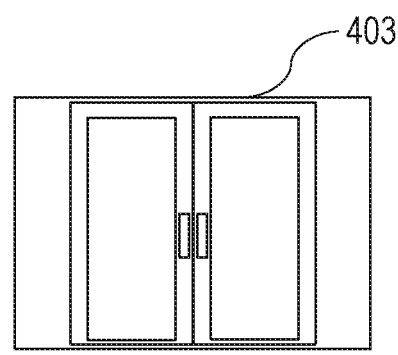
Figure 3C:
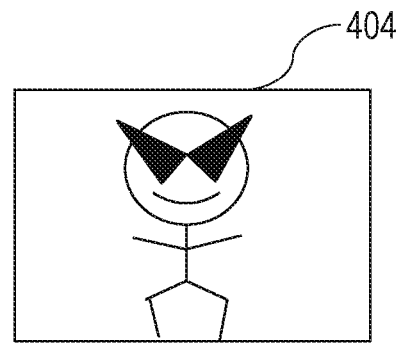

FIGS. 3A to 3C are diagrams illustrating a process of cutting out a cutout image (a partial image) from a captured image (non-cutout image). In each embodiment, the cutout image refers to an image corresponding to a part of a captured image. To extract a cutout image from a captured image, various methods may be employed. For example, a cutout image may by obtained by controlling reading of data from the image sensing device, or by generating image data and further generating a cutout image from the generated image data. As described above, the cutout image is an image corresponding to a partial area of a captured image. A non-cutout image from which a partial image is extracted may be an original captured image itself captured by the image capture unit 101, or may be an image obtained by deleting a peripheral area of the captured image captured by the image capture unit 101. The non-cutout image may be an image captured not via a fish-eye lens but via an ordinary lens.

FIG. 3A illustrates a fish-eye image 400 as an example of a non-cutout image. In FIG. 3A, 401 and 402 denote two cutout positions (cutout areas) at which images are cut out from a fish-eye image 400. FIG. 3B illustrates a cutout image 403 obtained by cutting out an image at the cutout position 401 and further performing a distortion correction on the extracted image. FIG. 3C illustrates a cutout image 404 obtained by cutting out an image at the cutout position 402 and further performing a distortion correction on the extracted image.

As described above, in many cases, both an extraction process and a distortion correction process are performed on the fish-eye image 400. The overall process including the extraction process and the distortion correction process is called a dewarping process. In the distortion correction process in the dewarping process, distortion or inclination caused by the fish-eye lens is adjusted and converted into an image similar to an image in a form viewed by a human.

Note that the dewarping process does not necessarily need to be executed, and the cutout image may be an arbitrary image corresponding to a part of a captured image used as a non-cutout image. For example, in a case where the image capturing apparatus does not use a fish-eye lens, the distortion correction process by the dewarping process or the like may not be executed.

The system control unit 103 of the image capturing apparatus 100 may deliver a video stream of the fish-eye image 400 which is a non-cutout image, a video stream of the cutout image 403, and a video stream of the cutout image 404 via the communication unit 107. These video streams may all be transmitted to the single client apparatus 200, or the respective video streams may be transmitted to different client apparatuses 200.

The system control unit 103 may store the three video streams described above in the image storage unit 106. The three video streams may all be delivered simultaneously. The three video streams may all be stored simultaneously.

Note that in the following description, the term "video stream" is used to broadly describe video streams such that video data that is stored in a storage without being transmitted is also called a video stream. When a simple description of "video stream" is used, the video stream can be either a cutout image video stream or a non-cutout image video stream.

Referring to FIG. 4, a processing flow of a dewarping process according to the present embodiment is described below.

In S500, the system control unit 103 identifies a cutout image position in the fish-eye image 400 specified by a position setting parameter, which will be explained later. The position of the cutout image is specified by position setting parameters, and more specifically, for example, by coordinates of four points (b1 to b4) with respect to an origin "a" taken at an upper left corner of a fish-eye image 400. Each of two circular-arc edges of a region of a cutout image may be calculated from a position of a center c of a circle defining a circular outer edge of the fish-eye image 400 and a size of the circle. The region of the cutout image may be limited such that the region has a fan shape. In this case, the cutout position may be specified only by b1 and b4.

Next, in S501, the system control unit 103 cuts out an image at the identified cutout image position (an image in the identified area) from the fish-eye image 400.

Next, in S502, the system control unit 103 corrects distortion of the cutout image by performing a geometric transform or the like such that a rectangular cutout image is obtained.

Next, referring to FIG. 5, preset parameter sets according to the present embodiment, and an influence of the preset parameter sets on other video streams are described.

A table 600 indicates an example as to whether each parameter included in a preset parameter set exerts an influence on a video stream other than a video stream of interest to which the parameter of the preset parameter set is applied. In this table, a field 602 indicates by way of example whether an influence is exerted or not by a parameter included in each preset parameter set. Note that the preset parameter set includes, for example, one parameter or a plurality of parameters.

In a presetting function realized using preset parameter sets, for example, a position of a cutout image relative to a non-cutout image is stored. When a user selects a particular preset parameter set, a cutout image at a position (in an area) specified by the selected preset parameter set is extracted and transmitted from the image capturing apparatus 100. The preset parameter set may include an image quality setting parameter for controlling image quality. In the present embodiment, the preset parameter set includes at least either a position setting parameter or an image quality setting parameter. Note that the preset parameter set may include another parameter.

As described above, the preset parameter sets are managed in the same manner by the presetting function regardless of parameters included in the respective preset parameter sets.

Each parameter in the preset parameter set is registered via the input unit 202 of the client apparatus 200 in advance by a user before the presetting function is activated. A user is allowed to specify a parameter and its parameter value for each preset parameter set. As for the position setting parameter, the parameter value may be given by specifying an area to be cut out from a non-cutout image. Some of preset parameter sets may be registered in advance before shipment.

When a user specifies (selects) a preset parameter set, the system control unit 203 of the client apparatus 200 transmits a command to the image capturing apparatus 100 to control the image capturing apparatus 100 to output or store an image at a position and with image quality specified by the preset parameter set.

The system control unit 103 of the image capturing apparatus 100 transmits, to the client apparatus 200, a video stream with image quality specified by the received command or a video stream of a cutout image at a position specified by the command.

In addition to activate a preset parameter set by a user, the preset parameter can also be activated such that a video stream specified by a preset parameter set is to be transmitted at a scheduled particular time.

The preset parameter set 601 may include at least either a position setting parameter set (a parameter set specifying a cutout position) 603 or an image quality setting parameter set (a parameter set specifying image quality) 604. These parameters may be defined in each preset parameter set.

The position setting parameter set 603 includes parameters defining a position in a captured image at which a cutout image is to be extracted. The position of the cutout image may be defined, for example, by coordinates with respect to the origin taken at the upper left corner of the captured image. The position setting parameter set 603 is applied only to a video stream specified by the preset parameter set including the position setting parameter set 603, and thus the position setting parameter set 603 does not exert an influence on other video streams.

On the other hand, the image quality setting parameter set 604 includes a parameter defining image quality of a whole captured image, that is, a non-cutout image from which a cutout image may be extracted. The image quality setting parameter set 604 is allowed to be defined for the non-cutout image and is not allowed to be specified individually for each cutout image video stream, because the image quality setting parameter is applied to processes performed on non-cutout images or processes performed by the image capture unit 101.

For example, the image quality setting parameter set 604 includes parameters for adjusting, in the image capture unit 101 or the image processing unit 102, focusing, an exposure, a diaphragm, a shutter speed, and a zooming. The image quality setting parameter set 604 may also include a parameter specifying whether an a cut filter is to be used, and/or a parameter specifying whether an infrared illumination is to be used. In a case where the image capturing apparatus 100 has a PTZ (pan, tilt, zoom) drive capability, the image quality setting parameter may include a parameter specifying a PTZ position, or may include another parameter that modifies a non-cutout image. As described above, the image quality setting parameter set 604 includes parameters that exert an influence on other video streams.

The preset parameter set described above may be specified, at the client apparatus 200, by an operation performed by a user on the input unit 202. The image capturing apparatus 100 is capable of delivering a plurality of video streams. Therefore, a user is allowed to specify a plurality of preset parameter sets 601.

The plurality of preset parameter sets 601 include a preset parameter set including only a parameter (for example, a position setting parameter set) that does not exert an influence on a non-cutout image. The plurality of preset parameter sets 601 may include a preset parameter set including only a parameter (for example, an image quality setting parameter set) that exerts an influence on a non-cutout image.

Figure 6:
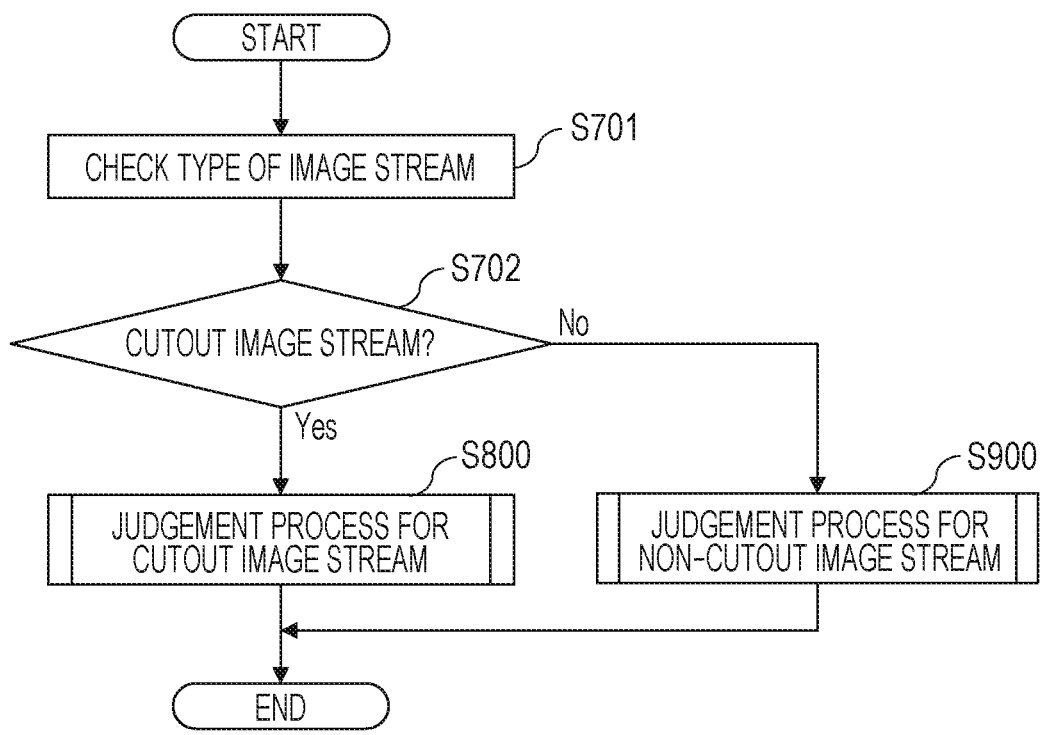
FIG. 6 is a flow chart illustrating a process of determining priority of a preset parameter set depending on a video stream according to a first embodiment.

Next, referring to FIG. 6, a method of determining a priority of a preset parameter set depending on a video stream according to the present embodiment is described. As an example, a flow of the determination process is described for a case where the priority of the preset parameter set is determined by the system control unit 203 of the client apparatus 200. Note that the process shown in the flow chart in FIG. 6 may be executed by the system control unit 103 in the image capturing apparatus 100. In this case, the process shown in the flow chart in FIG. 6 is executed by the system control unit 103 in a similar manner as described above except that information regarding the priority of the preset parameter set determined by the system control unit 103 is transmitted to the client apparatus 200. This also holds for the other embodiments.

In S701, the system control unit 203 checks the type of the video stream being currently delivered to the client apparatus 200 from the image capturing apparatus 100. That is, the determination is performed as to whether the video stream is a non-cutout image video stream or a cutout image video stream, or whether a non-cutout image video stream and a cutout image video stream are both being delivered.

In S702, if the system control unit 203 determines that the result of the determination in S701 indicates that the video stream being delivered is a cutout image video stream, the processing flow proceeds to S800. However, in a case where the video stream being delivered is not a cutout image video stream, the processing flow proceeds to S900. Note that the determination performed in S702 may be as to whether the video stream being delivered is a non-cutout image video stream.

In a case where a plurality of video streams are being delivered, the determination may be performed such that either cutout image video streams or non-cutout image video streams that are greater than the other in terms of the number of video streams being delivered are regarded as video streams being currently delivered.

FIG. 7 is a flow chart illustrating details of the process, performed in S800 shown in FIG. 6, to determine priorities of preset parameter sets for cutout image video streams.

In S801, the system control unit 203 determines whether a position setting parameter specifying an image cutout position is defined (included) in the preset parameter set. In a case where a position setting parameter is defined, the processing flow proceeds to S802. On the other hand, in a case where no position setting parameter is defined in the preset parameter set, the processing flow proceeds to S805.

Next, in S802, the system control unit 203 determines whether an image quality setting parameter is defined in the preset parameter set. In a case where no image quality setting parameter is defined in the preset parameter set, the processing flow proceeds to S803. On the other hand, in a case where an image quality setting parameter is defined in the preset parameter set, the processing flow proceeds to S804.

In S803, the system control unit 203 determines that the preset parameter set of interest under the determination is a high-priority preset parameter set.

In S804, the system control unit 203 determines that the preset parameter set of interest under the determination is a middle-priority preset parameter set.

In S805, the system control unit 203 determines that the preset parameter set of interest under the determination is a low-priority preset parameter set. The above-described determination is performed on each preset parameter set.

As described above, in a case where the client apparatus 100 is receiving a cutout image video stream, a highest priority is for a preset parameter set including only a position setting parameter. A next highest priority is for a preset parameter set including both a position setting parameter and an image quality setting parameter. A lowest priority is for a preset parameter set including only an image quality setting parameter.

FIG. 8 is a flow chart illustrating details of the process, performed in S900 shown in FIG. 6, to determine priorities of preset parameter sets for non-cutout image video streams.

In S901, the system control unit 203 determines whether an image quality setting parameter is defined (included) in the preset parameter set. If an image quality setting parameter is defined in the preset parameter set, the processing flow proceeds to S902. On the other hand, if no image quality setting parameter is defined in the preset parameter set, the process flow proceeds to S905.

Next, in S902, the system control unit 203 determines whether a position setting parameter is defined in the preset parameter set. If no position setting parameter is defined in the preset parameter set, the process proceeds to S903. On the other hand, if a position setting parameter is defined in the preset parameter set, the process proceeds to S904.

In S903, the system control unit 203 determines that the preset parameter set of interest under the determination is a high-priority preset parameter set.

In S904, the system control unit 203 determines that the preset parameter set of interest under the determination is a middle-priority preset parameter set.

In S905, the system control unit 203 determines that the preset parameter set of interest under the determination is a low-priority preset parameter set. The above-described determination is performed on each preset parameter set.

As described above, in a case where the client apparatus 100 is receiving a video stream of a non-cutout image, a highest priority is for a preset parameter set including only an image quality setting parameter. A next highest priority is for a preset parameter set including both a position setting parameter and an image quality setting parameter. A lowest priority is for a preset parameter set including only a position setting parameter.

FIGS. 9A to 9C illustrate an example of a result of the priority determination described above with reference to FIG. 8.

A table 1100 indicates whether each registered preset parameter set includes a position setting parameter and whether each registered preset parameter set includes an image quality setting parameter. In this table 1100, each open circle indicates that a parameter set of a type described in a corresponding column is included in a preset parameter set described in each row.

Tables 1101 and 1102 indicate results of the priority determined by the system control unit 203.

The table 1101 indicates the priority of each preset parameter set for a case where the type of the video stream being received by the client apparatus 200 is a cutout video stream. In the table 1101, a high priority is assigned to preset parameter set #2, preset parameter set #3, preset parameter set #7, preset parameter set #9, and preset parameter set #10. On the other hand, a middle priority is assigned to preset parameter set #4, preset parameter set #5, and preset parameter set #11, and a low priority is assigned to preset parameter set #1, preset parameter set #6, and preset parameter set #8.

The table 1102 indicates the priority of each preset parameter set for a case where the type of the video stream being received by the client apparatus 200 is a non-cutout video stream. In the table 1102, a high priority is assigned to preset parameter set #1, preset parameter set #6, and preset parameter set #8. On the other hand, a middle priority is assigned to preset parameter set #4, preset parameter set #5, and preset parameter set #11, and a low priority is assigned to preset parameter set #2, preset parameter set #3, preset parameter set #7, preset parameter set #9, and preset parameter set #10.

Next, referring to FIGS. 10A and 10B, FIGS. 11A and 11B, and FIGS. 12A and 12B, selection screens for selecting preset parameter sets at the client apparatus 200 are described.

Figure 10A:
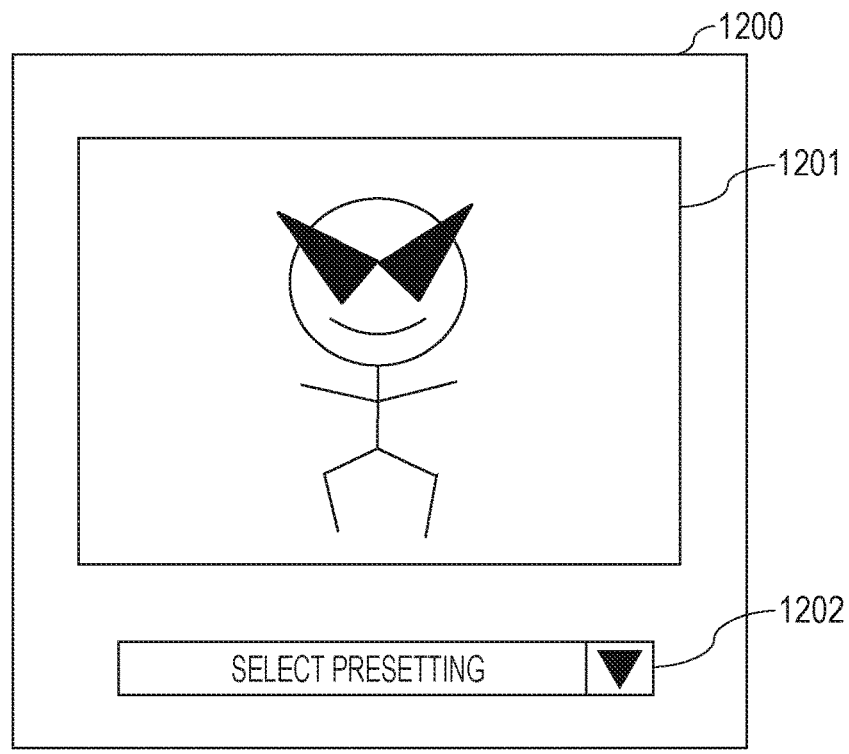
FIGS. 10A and 10B are diagrams each illustrating an example of a screen for selecting a preset parameter set at a client apparatus according to an embodiment.

In a screen 1200 shown in FIG. 10A, a cutout image 1201 being received by the client apparatus 200 is displayed. A pull-down tab 1202 for opening a selection screen for selecting a preset parameter set is also displayed.

Figure 10B:
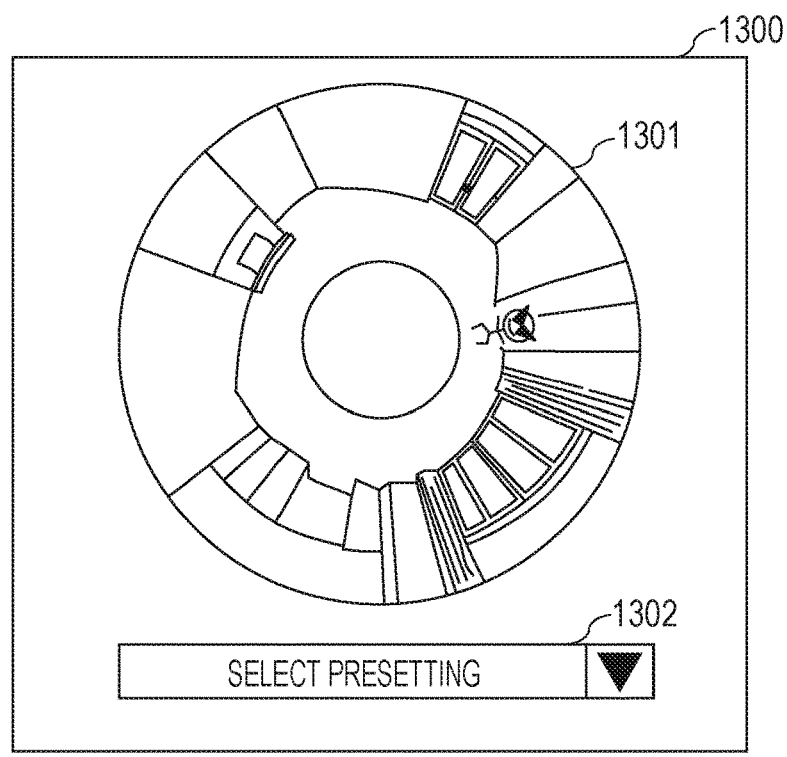

In a screen 1300 shown in FIG. 10B, a non-cutout image 1301 being received by the client apparatus 200 is displayed. A pull-down tab 1302 for opening a selection screen for selecting a preset parameter set is also displayed.

As described above, the system control unit 203 displays an image and a GUI on the display unit 201 such that when a video stream of an image (1201 or 1301 in this example)

being received is displayed, a GUI (1202 or 1302 in this example) for selecting a preset parameter set corresponding to the video stream being displayed is also displayed.

Figure 11A:
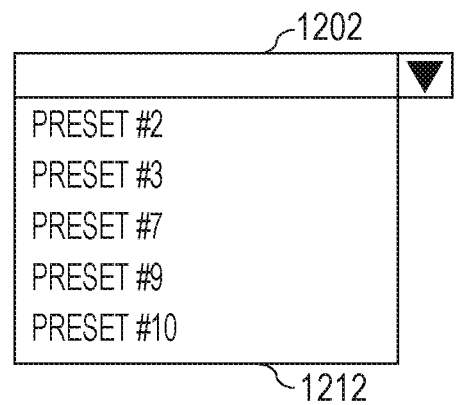
FIGS. 11A and 11B are diagrams each illustrating an example of a selection screen for selecting a preset parameter set depending on a video stream according to the first embodiment.
Figure 11B:
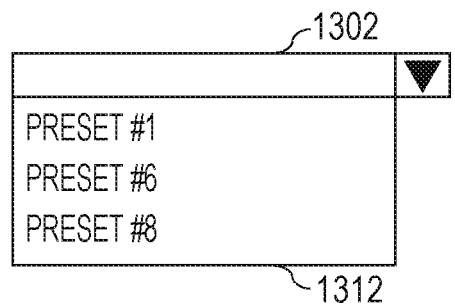

FIGS. 11A and 11B illustrate examples of preset parameter set selection screens. These screens are displayed on the display unit 201 under the control of the system control unit 203.

FIG. 11A illustrates a preset parameter set selection screen 1212 that is displayed when a user selects the pull-down tab 1202 on the screen 1200 shown in FIG. 10A. In the selection screen 1212 shown in FIG. 11A, names of preset parameter sets displayed as selection candidates are only those that are determined high in priority in a case where the video stream being received is a cutout image video stream (1201 in this present example). That is, in response to operating on the screen 1200 on which the cutout image 1201 is displayed, the selection screen 1212 including only names of preset parameter sets having high priority for the cutout image 1201 is displayed on the display unit 201 under the control of the system control unit 203.

FIG. 11B illustrates a preset parameter set selection screen 1312 that is displayed when a user selects the pull-down tab 1302 on the screen 1300 shown in FIG. 11B. In the selection screen 1312 shown in FIG. 11B, names of preset parameter sets displayed as selection candidates are only those that are determined high in priority in a case where a video stream being received is a non-cutout image video stream (1301 in this present example). That is, in response to operating on the screen 1300 on which the non-cutout image 1301 is displayed, the selection screen 1312 including only preset parameter sets having high priority for the non-cutout image 1301 is displayed on the display unit 201 under the control of the system control unit 203.

Note that each selection screen may include names of preset parameter sets determined as middle in priority. In a case where both a cutout image video stream and a non-cutout image video stream are being received, the selection screen being displayed may be changed to a selection screen 1212 or 1312 depending on the screen (1200 or 1300) operated.

When a user selects a preset parameter set on the selection screen 1212 or 1312 by operating the input unit 202, the system control unit 203 transmits, to the image capturing apparatus 100, a command for activating the selected preset parameter set. The image capturing apparatus 100 executes a process according to the received command. For example, in a case where the selected preset parameter set includes an image quality setting parameter, the image capturing apparatus 100 changes the process performed in the image capturing apparatus 100 such that a video stream with the image quality specified by the image quality setting parameter in the selected preset parameter set is transmitted. On the other hand, in a case where the selected preset parameter set includes a position setting parameter, the image capturing apparatus 100 changes the process performed in the image capturing apparatus 100 such that a video stream of a partial image at a position specified by the position setting parameter in the selected preset parameter set is transmitted.

Figure 12A:
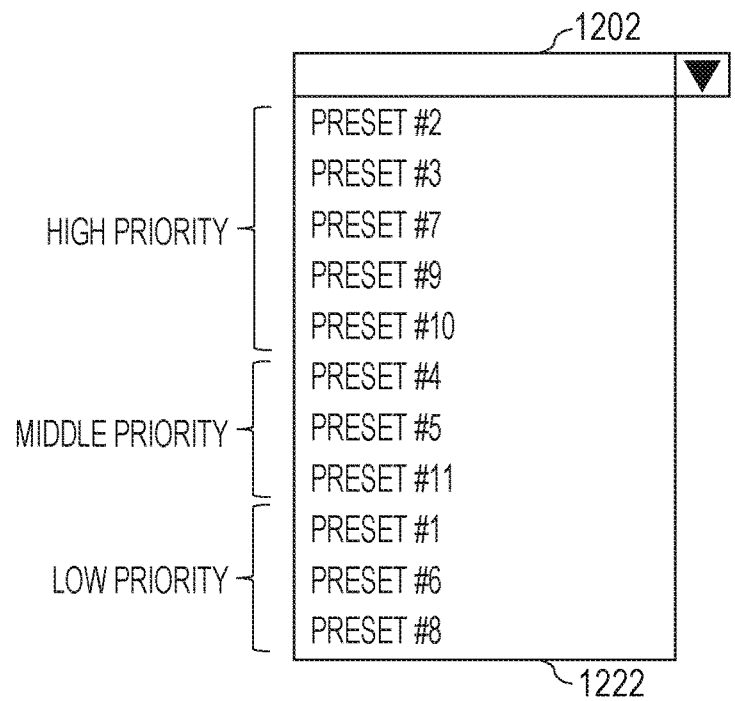
FIGS. 12A and 12B are diagrams each illustrating an example of a selection screen for selecting a preset parameter set depending on a video stream according to the first embodiment.
Figure 12B:
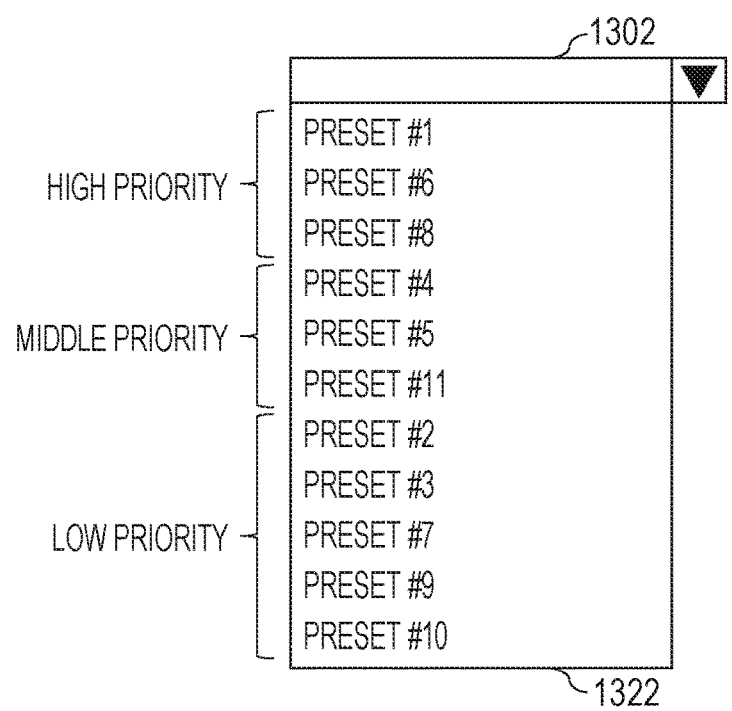

Next, referring to FIGS. 12A and 12B, further examples of preset parameter set selection screens are described.

FIG. 12A illustrates a preset parameter set selection screen 1222 that is displayed when a user selects the pull-down tab 1202 on the screen 1200 shown in FIG. 10A. In FIG. 12A, names of preset parameter sets are displayed in order of priority from high to low defined for a case where the video stream being received is the cutout video stream 1201.

FIG. 12B illustrates a preset parameter set selection screen 1322 that is displayed when a user selects the pull-down tab 1302 on the screen 1300 shown in FIG. 10B. In FIG. 12A, names of preset parameter sets are displayed in order of priority from high to low defined for a case where the video stream being received is the non-cutout video stream 1301.

Figure 17:
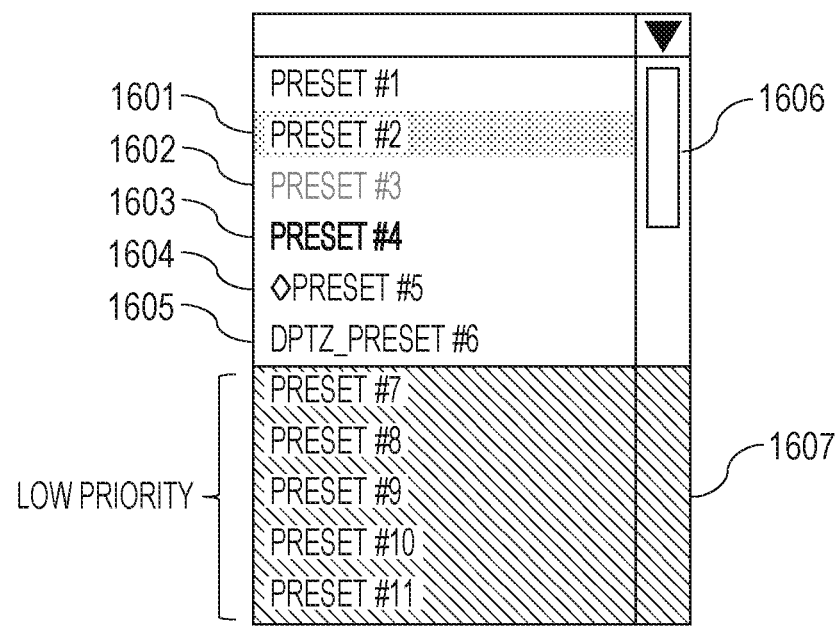
FIG. 17 is a diagram illustrating an example of a selection screen for selecting a preset parameter set depending on a video stream according to an embodiment.

Instead of displaying the preset parameter sets in order of the priority, a display mode may be changed depending on the priority as illustrated in FIG. 17.

For example, a background color of each preset parameter set name may be changed depending on the priority. For example, a name 1601 of a preset parameter set with high priority may be displayed in red, yellow, or the like so as to be conspicuous.

Alternatively, the color of the font of characters of each preset parameter set name may be changed depending on the priority. For example, a name 1602 of a preset parameter set with high priority may be displayed in a red or yellow font so as to be conspicuous.

Alternatively, the font of characters of each preset parameter set name may be changed depending on the priority. For example, a name 1603 of a preset parameter set with high priority may be displayed in a bold font.

Alternatively, a mark may be displayed adjacent to each preset parameter set name depending on the priority. For example, a particular mark is displayed adjacent to a name 1604 of a preset parameter set with high priority in the example shown in FIG. 17.

Alternatively, a prefix may be displayed adjacent to each preset parameter set name depending on the priority. For example, a particular prefix is displayed in front of a name 1605 of a preset parameter set with high priority in the example shown in FIG. 17.

Names of preset parameter sets with low priority such as a names 1607 in the example shown in FIG. 17 may not be displayed unless a scroll bar 1606 is operated by a user.

As described above, the selection screen may be displayed in a manner that allows it to easily select a preset parameter set suitable for a video stream being currently interested by a user. This also makes it possible to reduce the probability that a preset parameter set which is not suitable for a video stream of interest is selected by mistake, and thus it is possible to reduce the probability that a large processing load occurs when an incorrect preset parameter set is selected by mistake.

Second Embodiment

In the first embodiment described above, one preset parameter set is allowed to include both a position setting parameter and an image quality setting parameter. In a second embodiment described below, one preset parameter set is allowed to include only one of a position setting parameter and an image quality setting parameter. In the following description, overlapping with the first embodiment will be avoided.

Figure 13:
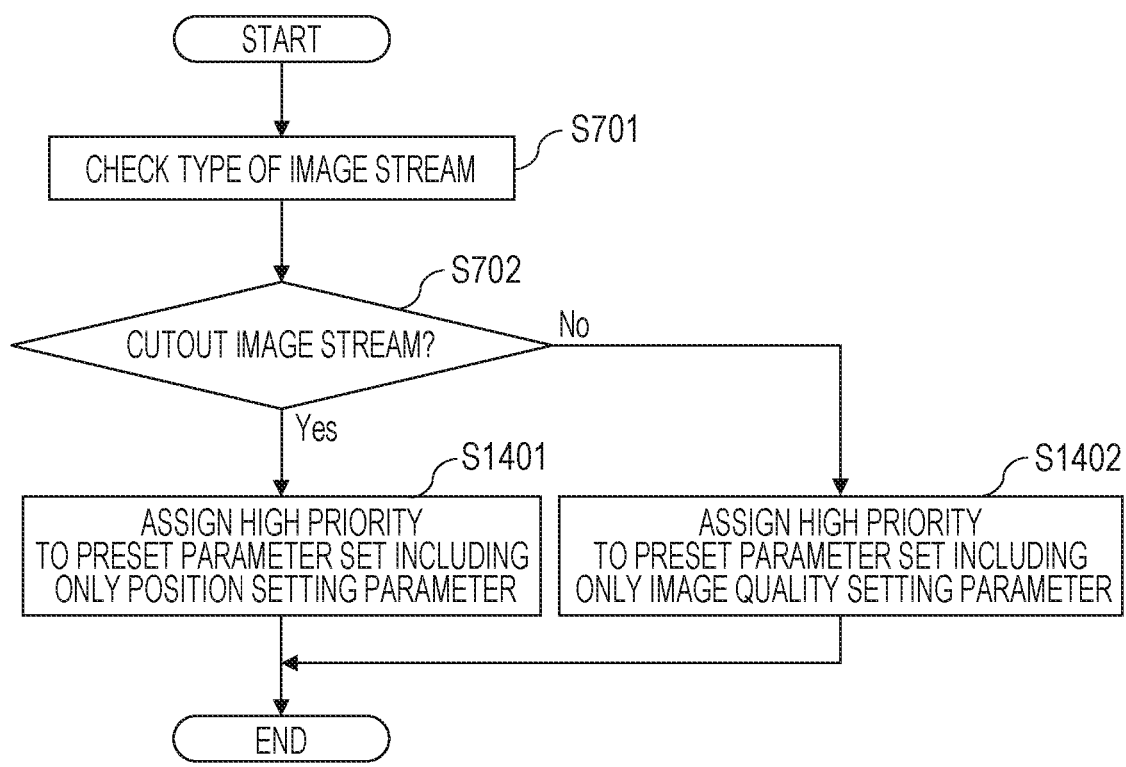
FIG. 13 is a flow chart illustrating a process of determining priority of a preset parameter set depending on a video stream according to a second embodiment.

Referring to FIG. 13, a method of determining a priority of a preset parameter set depending on a video stream according to the present embodiment is described.

In S701, the system control unit 203 checks the type of the video stream being currently delivered to the client apparatus 200 from the image capturing apparatus 100. That is, the determination is performed as to whether the video stream is a non-cutout image video stream or a cutout image video stream.

In S702, if the system control unit 203 determines that the result of the determination in S701 indicates that the video stream being delivered is a cutout image video stream, then the processing flow proceeds to S1401. However, in a case where the video stream being delivered is not a cutout image video stream, the processing flow proceeds to S1402. Note that the determination performed in S702 may be as to whether the video stream being delivered is a non-cutout image video stream.

In a case where a plurality of video streams are being delivered, the determination may be performed such that either cutout image video streams or non-cutout image video streams that are greater than the other in terms of the number of video streams being delivered are regarded as video streams being currently delivered.

Then in step S1401, the system control unit 203 assigns high priority to a preset parameter set including only a position setting parameter, and assigns low priority to a preset parameter set including only an image quality setting parameter.

On the other hand, in step S1402, the system control unit 203 assigns high priority to a preset parameter set including only an image quality setting parameter, and assigns low priority to a preset parameter set including only a position setting parameter.

The above-described determination is performed on each preset parameter set.

Referring to FIGS. 14A to 14C, an example of a result of the priority determination described above with reference to FIG. 13 is described.

A table 1500 indicates whether each registered preset parameter set includes a position setting parameter and whether each registered preset parameter set includes an image quality setting parameter. In this table 1500, each open circle indicates that a parameter set of a type described in a corresponding column is included in a preset parameter set described in each row.

Tables 1501 and 1502 indicate results of the priority determined by the system control unit 203.

The table 1501 indicates the priority of each preset parameter set for a case where the type of the video stream being received by the client apparatus 200 is a cutout video stream. In the table 1501, a high priority is assigned to preset parameter set #2, preset parameter set #3, preset parameter set #4, preset parameter set #5, preset parameter set #7, preset parameter set #9, preset parameter set #10, and preset parameter set #11, while a low priority is assigned to preset parameter set #1, preset parameter set #6, and preset parameter set #8.

On the other hand, the table 1502 indicates the priority of each preset parameter set for a case where the type of the video stream being received by the client apparatus 200 is a non-cutout video stream. In the table 1502, a high priority is assigned to preset parameter set #1, preset parameter set #6, and preset parameter set #8, while a low priority is assigned to preset parameter set #2, preset parameter set #3, preset parameter set #4, preset parameter set #5, preset parameter set #7, preset parameter set #9, preset parameter set #10, and preset parameter set #11.

Next, referring to FIGS. 10A and 10B, FIGS. 15A and 15B, and FIGS. 16A and 16B, selection screens for selecting preset parameter sets at the client apparatus 200 according to the present embodiment are described.

Figure 15A:
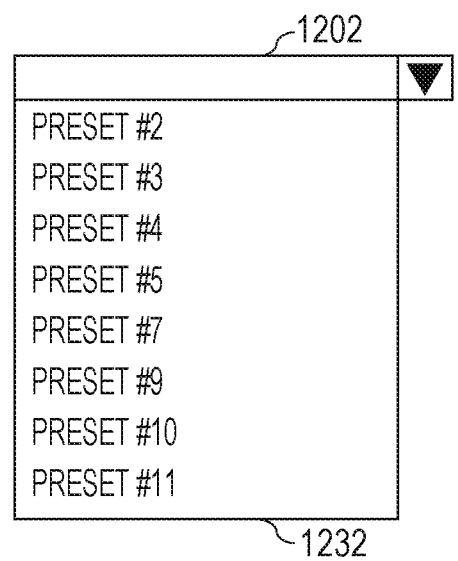
FIGS. 15A and 15B are diagrams each illustrating an example of a selection screen for selecting a preset parameter set depending on a video stream according to the second embodiment.
Figure 15B:
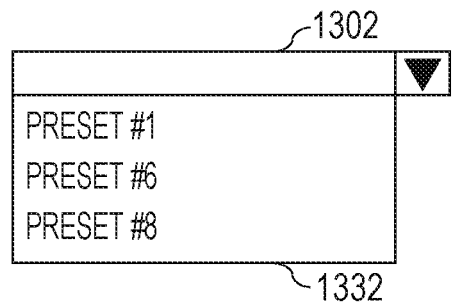

FIGS. 15A and 15B illustrate examples of preset parameter set selection screens according to the present embodiment. These screens are displayed on the display unit 201 under the control of the system control unit 203.

FIG. 15A illustrates a preset parameter set selection screen 1232 that is displayed when a user selects the pull-down tab 1202 on the screen 1200 shown in FIG. 10A. In FIG. 15A, names of preset parameter sets displayed as selection candidates in the selection screen 1232 are only those that are determined high in priority in a case where the video stream being received is a cutout image video stream (1201 in this present example). That is, in response to operating on the screen 1200 on which the cutout image 1201 is displayed, the selection screen 1242 including only preset parameter sets having high priority for the cutout image 1201 is displayed on the display unit 201 under the control of the system control unit 203.

FIG. 15B illustrates a preset parameter set selection screen 1332 that is displayed when a user selects the pull-down tab 1302 on the screen 1300 shown in FIG. 10B. In FIG. 15B, names of preset parameter sets displayed as selection candidates in the selection screen 1332 are only those that are determined high in priority in a case where the video stream being received is a non-cutout image video stream (1301 in this present example). That is, in response to operating on the screen 1300 on which the non-cutout image 1301 is displayed, the selection screen 1332 including only preset parameter sets having high priority for the non-cutout image 1301 is displayed on the display unit 201 under the control of the system control unit 203.

When a user selects a preset parameter set on the selection screen 1212 or 1312 by operating the input unit 202, the system control unit 203 transmits to the image capturing apparatus 100 a command for applying the selected preset parameter set. The image capturing apparatus 100 executes a process according to the received command.

Figure 16A:
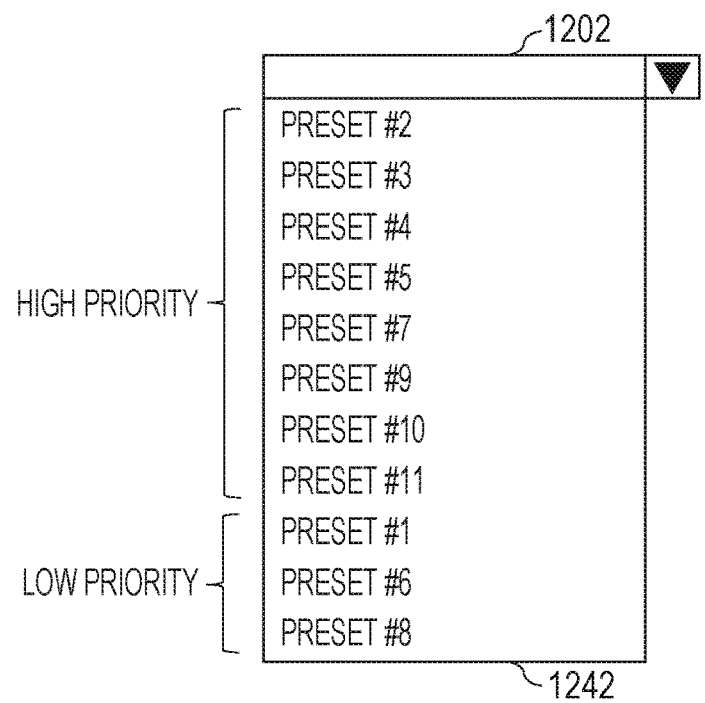
FIGS. 16A and 16B are diagrams each illustrating an example of a selection screen for selecting a preset parameter set depending on a video stream according to the second embodiment.
Figure 16B:
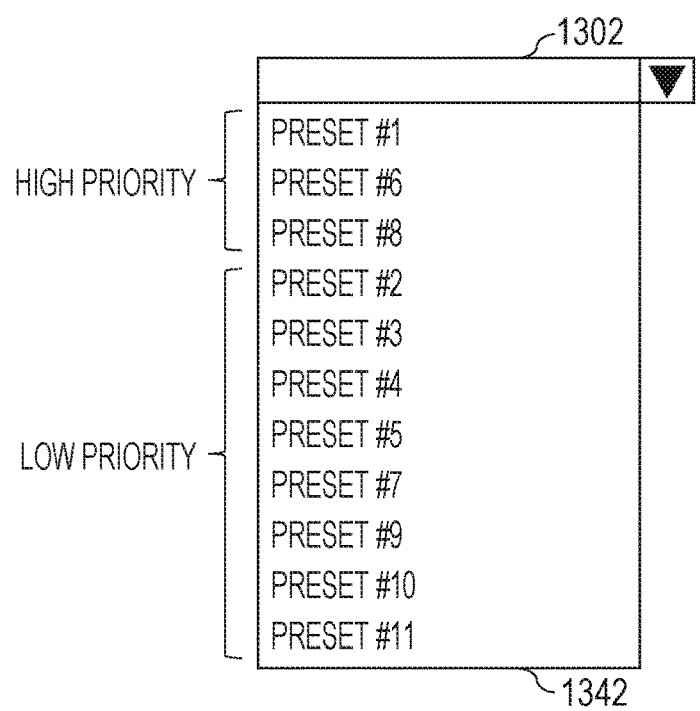

Next, referring to FIGS. 16A and 16B, further examples of preset parameter set selection screens are described.

FIG. 16A illustrates a preset parameter set selection screen 1242 that is displayed when a user selects the pull-down tab 1202 on the screen 1200 shown in FIG. 10A. In FIG. 16A, names of preset parameter sets are displayed in order of priority from high to low defined for a case where the video stream being received is the cutout video stream 1201.

FIG. 16B illustrates a preset parameter set selection screen 1342 that is displayed when a user selects the pull-down tab 1302 on the screen 1300 shown in FIG. 10B. In FIG. 16B, names of preset parameter sets are displayed in order of priority from high to low defined for a case where the video stream being received is the non-cutout video stream 1301.

As described above, the selection screen may be displayed in a manner that allows it to easily select a preset parameter set suitable for a video stream being currently interested by a user. This also makes it possible to reduce the probability that a preset parameter set which is not suitable for a video stream of interest is selected by mistake, and thus it is possible to reduce the probability that a large processing load occurs when an incorrect preset parameter set is selected by mistake.

Other Embodiments

Next, referring to FIG. 18, a hardware configuration for realizing various functions according to embodiments is described below. Note that the image processing unit 102, the system control unit 103, and the like in the image capturing apparatus 100 can be realized by the hardware configuration shown in FIG. 18. The system control unit 203, the communication unit 204, and the like in the client apparatus 200 can also be realized by the hardware configuration shown in FIG. 18.

A RAM (Random Access Memory) 222 temporarily stores a computer program executed by a CPU (Central Processing Unit) 221. The RAM 222 also stores temporarily data (a command or image data) acquired from the outside via a communication interface 224. The RAM 222 also provides a work area used by the CPU 221 in executing various processes. The RAM 222 also functions as a frame memory or a buffer memory.

The CPU 221 executes the computer program stored in the RAM 222. Instead of the CPU, a processor such as a DSP (Digital Signal Processor) or an ASIC (Application Specific Integrated Circuit) may be used.

An HDD (Hard Disk Drive) 223 stores an operating system program and image data. The HDD 223 also stores a computer program.

The computer program and the data stored in the HDD 223 are loaded as required into the RAM 222 under the control of the CPU 221, and executed by the CPU 221. Instead of or in addition to the HDD, another storage medium such as a flash memory may be used. A bus 225 connects various hardware units. The various hardware units transmit and receive data between each other via the bus 225. The hardware configuration employable in each embodiment has been described above.

One or more of functions of the embodiments of the present disclosure may also be implemented by reading one or more programs and executing them by one or more processors. The one or more programs may be provided via a network or a storage medium to a system or an apparatus including the one or more processors. One or more of functions of the embodiments of the present disclosure may also be implemented using a circuit (such as an ASIC).

Figure 18:
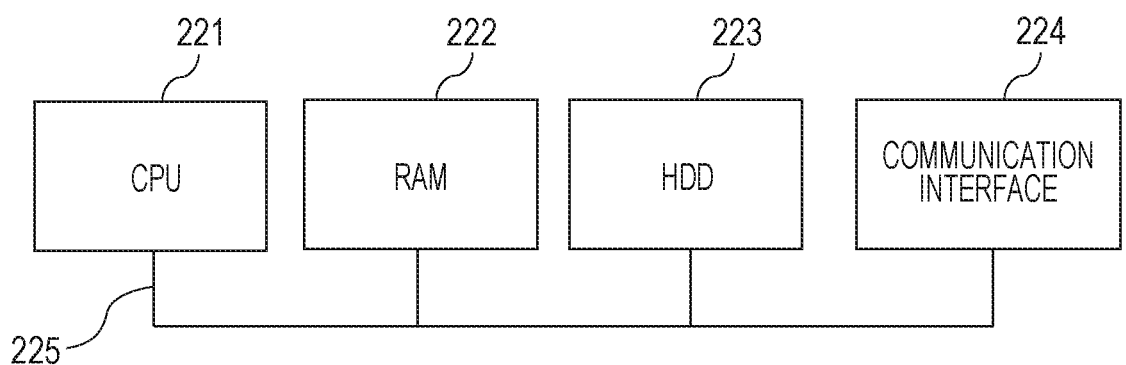
FIG. 18 is a diagram illustrating a hardware configuration of an image capturing apparatus and a client apparatus according to an embodiment.

Each functional block shown in FIG. 2 may be implemented by hardware shown in FIG. 18 or by software.

The present disclosure is not limited to the embodiments described above, but various modifications are possible without departing from the scope and the spirit of the present disclosure. For example, embodiments and/or modifications may be combined. Any of such combinations also falls within the scope of the present disclosure.

According to any of the embodiments described above, it is possible to display a setting screen capable of selecting a proper preset parameter set.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-153814 filed Aug. 9, 2017 which is hereby incorporated by reference herein in its entirety.

What is claimed is:

1. A control apparatus comprising a computer executing instructions that, when executed by the computer, cause the computer to function as:
   an acquisition unit configured to acquire at least one of a first image captured by an image capturing unit and a partial image corresponding to a partial area of the first image;
   a setting unit configured to set, to an image capturing apparatus including the image capturing unit, at least one of a plurality of preset parameter sets including at least one of a position setting parameter and an image quality setting parameter, the position setting parameter specifying a position of the partial image in the first image, and the image quality setting parameter specifying image quality of the first image; and
   a display control unit configured to control displaying so as to display, on a display unit, a selection screen for setting the at least one of the plurality of preset parameter sets to the image capturing apparatus,
   wherein the plurality of preset parameter sets are allowed to include
      a first preset parameter set that includes the position setting parameter and does not include the image quality setting parameter, and
      a second preset parameter set that includes the image quality setting parameter and does not include the position setting parameter,
   wherein the display control displays the selection screen on the display unit such that,
      in a case where the partial image is being acquired by the acquisition unit, the selection screen includes the first preset parameter set as a selectable parameter set but does not include the second present parameter set as a selectable parameter set, and
      in a case where the first image is being acquired by the acquisition unit, the selection screen includes the second preset set as a selectable set but does not include the first preset set as a selectable set.

2. The control apparatus according to claim 1, wherein the first image is a fish-eye image captured using a fish-eye lens, and
   the partial image is an image corresponding to a part of the fish-eye image and having been subjected to a distortion correction process.

3. The control apparatus according to claim 1, wherein the instructions further cause the computer to function as a transmission unit configured to transmit a command to the image capturing apparatus such that when an operation is performed on the selection screen to select a preset parameter set, the command for executing a control according to the selected preset parameter set is transmitted to the image capturing apparatus.

4. The control apparatus according to claim 1, wherein the display control unit displays, on the display unit, an image being acquired by the acquisition unit and a selection screen associated with the image.

5. A control method comprising:
acquiring at least one of a first image captured by an image capturing unit and a partial image corresponding to a partial area of the first image;
controlling displaying such that a selection screen for selecting at least one of a plurality of preset parameter sets is displayed on a display unit, the at least one of a plurality of preset parameter sets including at least one of a position setting parameter and an image quality setting parameter, the position setting parameter specifying a position of the partial image in the first image, and the image quality setting parameter specifying image quality of the first image; and
setting the least one preset parameter set selected by operating the selection screen in the image capturing apparatus including the image capturing unit,
wherein the plurality of preset parameter sets are allowed to include
a first preset parameter set that includes the position setting parameter and does not include the image quality setting parameter, and
a second preset parameter set that includes the image quality setting parameter and does not include the position setting parameter, and
wherein in the controlling the displaying, displaying the selection screen on the display unit is controlled such that,
in a case where the partial image is being acquired, the selection screen includes the first preset parameter set as a selectable parameter set but does not include the second present parameter set as a selectable parameter set, and
in a case where the first image is being acquired, the selection screen includes the second preset set as a selectable set but does not include the first preset set as a selectable set.

6. A non-transitory computer readable storage medium which stores a program characterized by causing a computer to perform steps comprising:
acquiring at least one of a first image captured by an image capturing unit and a partial image corresponding to a partial area of the first image;
controlling displaying such that a selection screen for selecting at least one of a plurality of preset parameter sets is displayed on a display unit, the at least one of a plurality of preset parameter sets including at least one of a position setting parameter and an image quality setting parameter, the position setting parameter specifying a position of the partial image in the first image, and the image quality setting parameter specifying image quality of the first image; and
setting the least one preset parameter set selected by operating the selection screen in the image capturing apparatus including the image capturing unit,
wherein the plurality of preset parameter sets are allowed to include
a first preset parameter set that includes the position setting parameter and does not include the image quality setting parameter, and
a second preset parameter set that includes the image quality setting parameter and does not include the position setting parameter, and
wherein in the controlling the displaying, displaying the selection screen on the display unit is controlled such that,
in a case where the partial image is being acquired, the selection screen includes the first preset parameter set as a selectable parameter set but does not include the second present parameter set as a selectable parameter set, and
in a case where the first image is being acquired, the selection screen includes the second preset set as a selectable set but does not include the first preset set as a selectable set.

7. The control method according to claim 5, wherein the first image is a fish-eye image captured using a fish-eye lens, and
the partial image is an image corresponding to a part of the fish-eye image and having been subjected to a distortion correction process.

8. The control method according to claim 5, further comprising transmitting a command to the image capturing unit such that when an operation is performed on the selection screen to select a preset parameter set, the command for executing a control according to the selected preset parameter set is transmitted to the image capturing unit.

9. The control method according to claim 5, wherein the display control unit displays, on the display unit, an image being acquired and a selection screen associated with the image.

* * * * *